US006802397B1

United States Patent
Matteis et al.

(10) Patent No.: US 6,802,397 B1
(45) Date of Patent: Oct. 12, 2004

(54) AUTOMATIC CABLE LATCHING DEVICE FOR DRUM BRAKE LEVERS

(75) Inventors: Davide Matteis, Cengio (IT); Vincenzo Giardina, Cairo Montenotte (IT)

(73) Assignee: Automotive Products Italia (SV) SPA, Savona (IT)

( * ) Notice: Subject to any disclaimer, the term of this patent is extended or adjusted under 35 U.S.C. 154(b) by 346 days.

(21) Appl. No.: 09/202,199

(22) Filed: Dec. 8, 1998

(30) Foreign Application Priority Data

Mar. 13, 1997 (GB) ................................. 9705206

(51) Int. Cl.⁷ ................................................ B60T 1/00
(52) U.S. Cl. ................................ 188/2 D; 188/106 A
(58) Field of Search ........................... 188/2 D, 106 F, 188/106 A, 106 P

(56) References Cited

U.S. PATENT DOCUMENTS

| | | | | |
|---|---|---|---|---|
| 3,661,233 A | * | 5/1972 | Margetts et al. | 188/106 A |
| 4,570,761 A | * | 2/1986 | Inoue | 188/78 |
| 4,595,084 A | * | 6/1986 | Le Deit | 188/328 |
| 4,753,325 A | * | 6/1988 | Jaksic | 188/2 D |
| 4,886,134 A | * | 12/1989 | Yamamoto | 188/20 |
| 4,886,146 A | * | 12/1989 | Copp | 188/2 D |
| 4,930,605 A | * | 6/1990 | Boyer et al. | 188/2 D |
| 4,932,503 A | * | 6/1990 | Yamamoto | 188/2 D |
| 4,955,458 A | * | 9/1990 | Shellhause | 188/2 D |
| 5,142,935 A | * | 9/1992 | Carr | 74/502.6 |
| 5,377,789 A | * | 1/1995 | Brooks, Sr. et al. | 188/20 |
| 5,538,116 A | * | 7/1996 | Parker et al. | 188/331 |
| 5,706,914 A | * | 1/1998 | Goldstein | 188/2 D |
| 6,105,732 A | * | 8/2000 | Venetos | 188/20 |

FOREIGN PATENT DOCUMENTS

| | | | |
|---|---|---|---|
| EP | 926 363 A1 | * | 6/1999 |
| FR | 2772704 | * | 6/1999 |
| JP | 41022050 | * | 8/1998 |

* cited by examiner

Primary Examiner—Douglas C. Butler
Assistant Examiner—Benjamin Pezzlo
(74) Attorney, Agent, or Firm—Paul E Milliken; Ray L Weber

(57) ABSTRACT

A parking brake assembly which includes a lever (15) for operation of a brake shoe (11, 12) to provide a parking function. The lever (15) has an automatic latching device (21, 22, 23) for automatically latching to the lever (15) an end fitting (20) on an operating cable (19). The automatic latching device (21, 22, 23) comprises a flap (22) mounted on the lever (15) which is deflected aside by the end fitting (20) as the cable (19) is fed in a first direction towards the lever (15) and which latches behind an abutment (20a) on the end fitting (20) to latch the cable (19) to the lever (15) so that subsequent movement of the cable (19) in a second direction opposite to the first direction moves the lever (15) to opoerate the parking function.

15 Claims, 5 Drawing Sheets

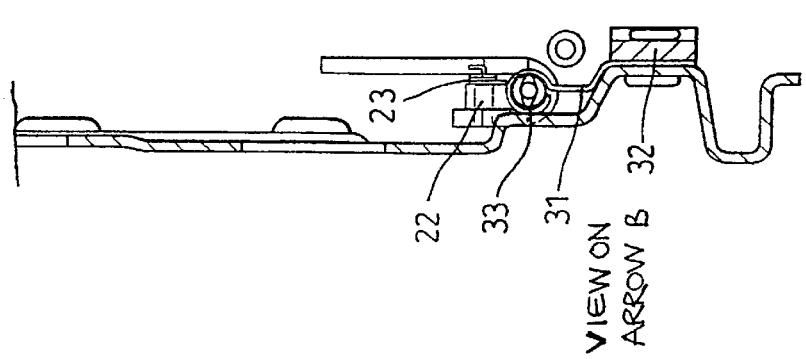
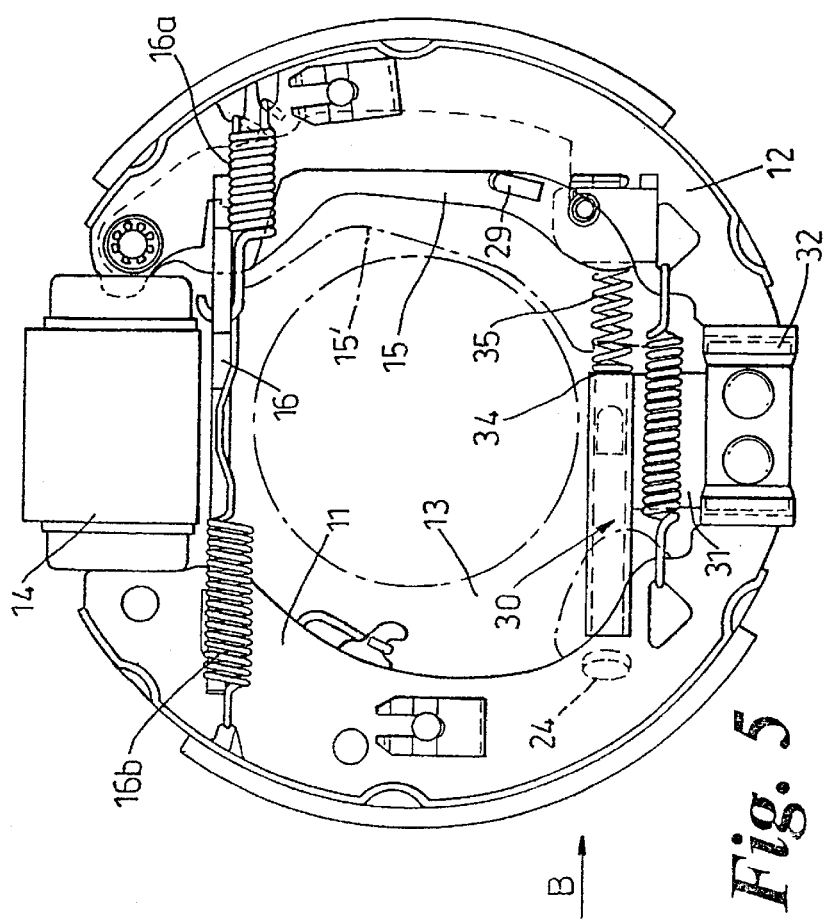
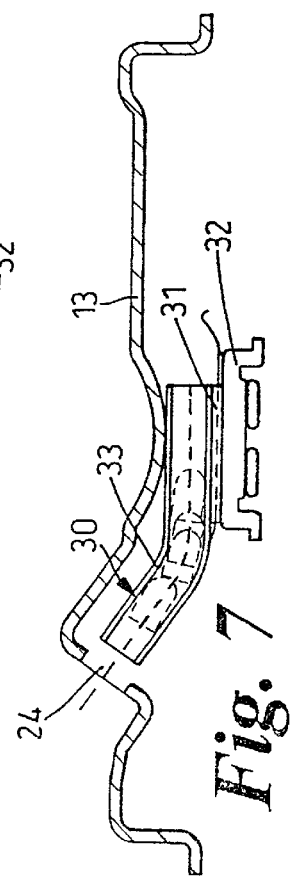

AUTOMATIC CABLE LATCHING DEVICE FOR DRUM BRAKE LEVERS

This invention relates to drum brakes and in particular to parking brake assemblies for use in drum brakes and which include an automatic latching device for latching an operating cable to a parking brake operating lever.

It is an object of the present invention to provide a parking brake assembly with an improved latching device.

Thus in accordance with the present invention there is provided a parking brake assembly which includes a lever for operation of a brake shoe to provide a parking function, the lever carrying an automatic latching device for automatically latching to the lever as end fitting on an operating cable, the assembly being characterised in that the automatic latching device comprises a flap mounted on the lever which is deflected aside by the end fitting as the cable is fed in first direction towards the lever and which latches behind an abutment on the end fitting to latch the cable to the lever so that subsequent movement of the cable in a second direction opposite to the first direction moves the lever to operate the parking function.

The flap preferably latches the cable against an edge of the lever.

The flap may be spring-biased or gravity biased towards the lever.

In a preferred arrangement an end of the lever is U-shaped in cross-section to form a channel and the flap is located adjacent one end of the channel with the cable having been fed along the channel and latched between the flap and an adjacent end edge of the channel.

The cable may be fed towards the lever through an opening in a back plate of the assembly via a guide means. The guide means may comprise a compression spring through which the cable is fed, one end of the spring being attached to the backplate and the other end to the lever.

Alternatively, the guide means may comprise a rigid tube. A compression spring may extend between an end of the tube adjacent the lever and the lever itself The invention also provides a drum brake which includes a parking brake assembly as described above.

The present invention will now be described, by way of example, with reference to the accompanying drawings in which:

FIGS. 5, 6 & 7 show side, end and part-sectional views of an alternative parking brake assembly with a rigid tubular cable guide.

Figure 1:
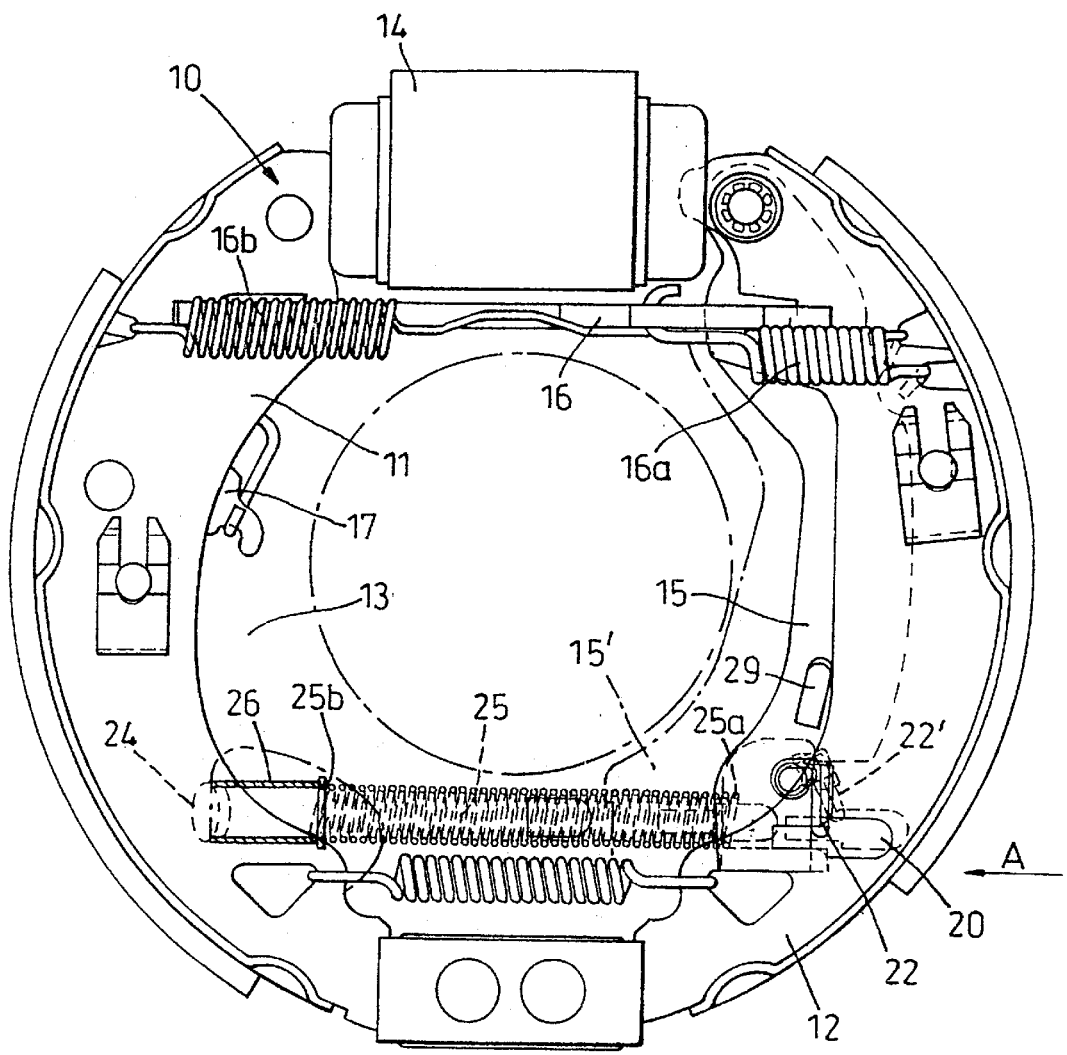
FIG. 1 is a side view of a drum brake which includes a parking brake assembly in accordance with the present invention.
Figure 2:
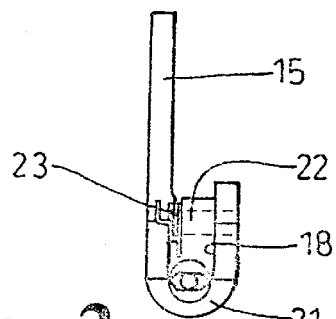
FIG. 2 is a view in the direction of arrow A of FIG. 1 of details of the latching flap of the assembly.
Figure 3:
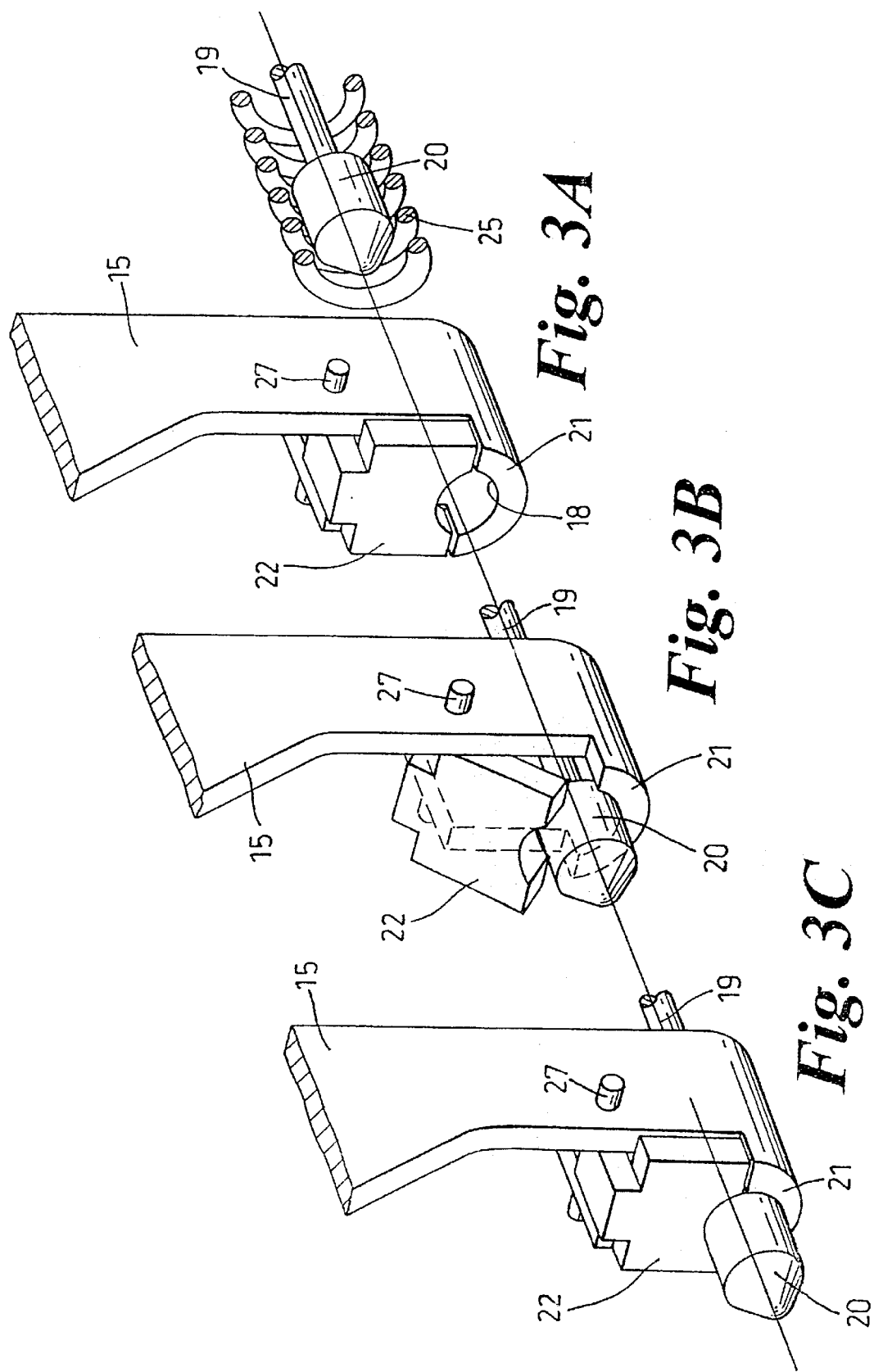
FIGS. 3A, 3B & 3C are perspective views showing three stages in the latching sequence of the latching flap of FIG. 2.

Referring to FIGS. 1 to 4 these show a drum brake 10 in which two brake shoes 11 and 12 are mounted on a backplate 13 for service application by an hydraulic cylinder 14 in the known manner. A parking brake function is provided in which pivoting of a parking lever 15 from the full line position shown in FIG. 1 to the dotted position 15' applies both shoes to the brake drum via a strut 16. Strut 16 which is held against shoe 12 at all times by spring 16a which extends between the brake shoes and, in addition to operating the parking brake, also limits the retracting of the shoes under the action of pull-off spring 16b. The effective length of strut 16 is adjusted by the handbrake adjusting mechanism part of which is visible at 17 and which is more fully described in the Applicant's UK patent number 2272261.

The lower end of pawing brake lever 15 is of U-shaped cross section to form a channel 18 (see FIG. 2) for the reception of the end of a handbrake operating cable 19 which has an end fitting 20.

Figure 4:
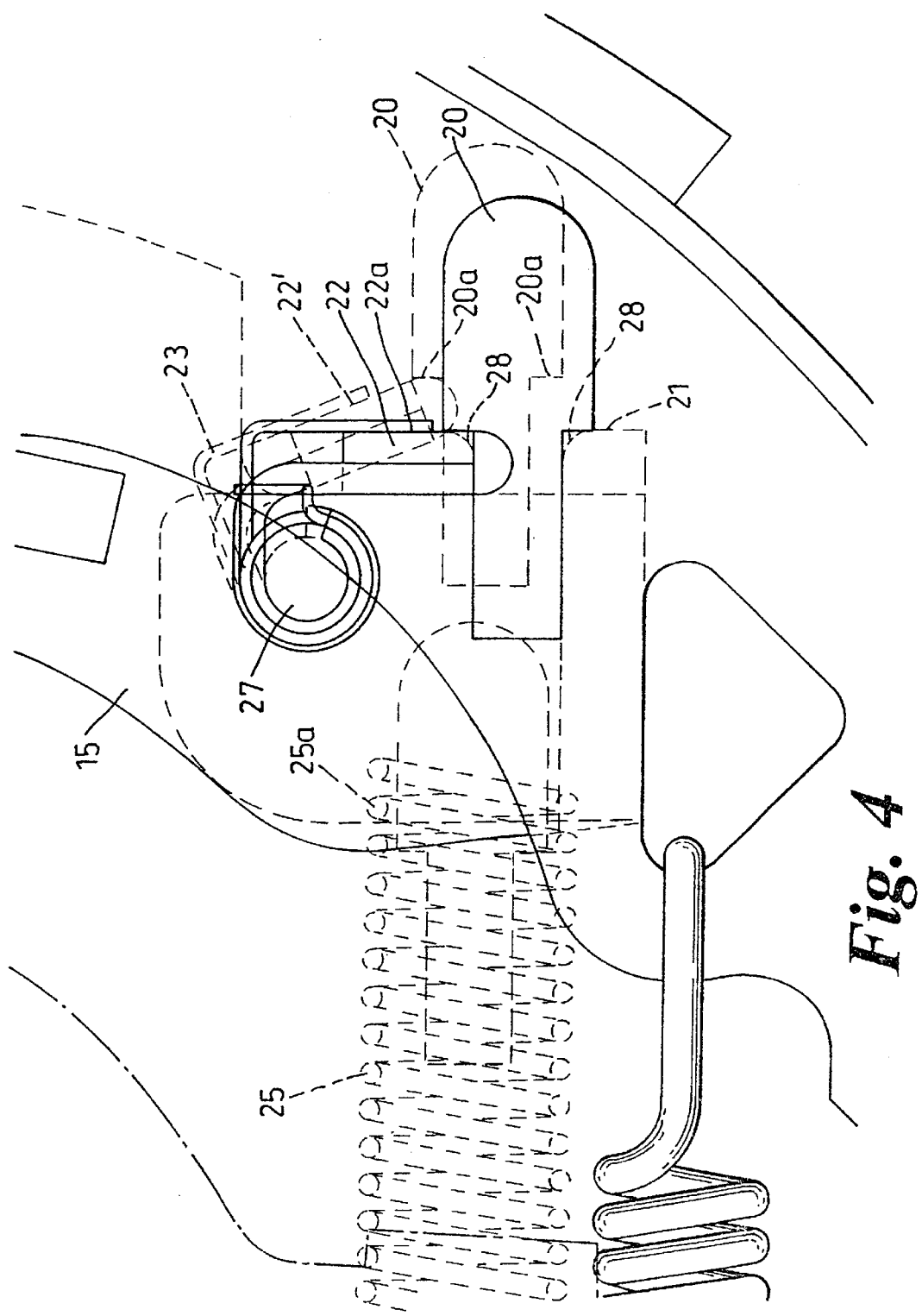
FIG. 4 shows the details of the latching flap of FIG. 1 on a larger scale.

Pivotally mounted on the lever 1 adjacent an edge 21 thereof is a latching device in the form of a flap 22 which is biased by coil spring 23 into the fill line position shown in detail in FIG. 4.

Backplate 13 is provided with an aperture 24 through which the actuating cable 19 is fed and a guide means in the form of a compression spring 25 extends between the aperture 24 and the end of the channel 18 in lever 15. The end 25a of spring 25 is received as a direct friction grip in the U-shaped channel 18 whilst the end 25b is connected with a short rigid tubular guide 26 which is supported in aperture 24. Compression spring 25 also loads lever 15 to tend to return the lever to the non-operative fill line position shown in FIG. 1 with tang 29 abutting the edge of shoe 12 when the handbrake function is released.

The attachment of the cable 19 to lever 15 is best seen from FIGS. 1 and 3A to 3C. The cable 19 with its end fitting 20 is fed through aperture 24 in backplate 13 and down the centre of guide spring 25 and into the end of channel 18 in lever 15. The end fitting then contacts the latching flap 22 and displaces the flap anti-clockwise about its pivot 27 as shown in dotted detail 22' in FIGS. 1 and 4. After the end fitting 20 has fully passed the flap 22 the flap 22 snaps back behind shoulder 20a on end fitting 20 to latch the cable between the lower edge of flap 22 and the edge 21 of lever 15 as shown in FIG. 3C.

Although the shoulder 20a, the edge 21 and the cooperating face 22a of flap 22 are all shown as being flat surfaces these could be of a cooperating curved configuration as shown in dotted detail 28 of FIG. 4. Also, the flap 22 need not necessarily be spring-loaded to its latching position but may rely on gravity to restore the flap to this position after deflection by the end fitting 20.

FIGS. 5, 6 and 7 show an alternative drum brake arrangement in which the guide spring 25 is replaced by a tubular guide 30 which extends from a location adjacent aperture 24 to a position adjacent the operating position 15' of lever 15. As best seen from FIG. 6, the tubular guide 30 is formed from a sheet metal member and has a support bracket 31 which is mounted on the brake shoe reacting abutment 32 and a rolled tubular portion 33 through which the handbrake and associated end fitting 20 are fed. The remaining features of FIGS. 5 to 6 are as previously described with reference to FIGS. 1 to 4.

As a still further alternative arrangement a compression spring may be attached between the free end 34 of tubular guide 30 and the U-shaped channel 18 of lever 15 as shown in dotted detail 35 in FIG. 5. This spring not only provides more accurate guiding of the cable into the U-shaped channel 18 but also return the level 15 to its non-operating position.

Figures 8, 9:
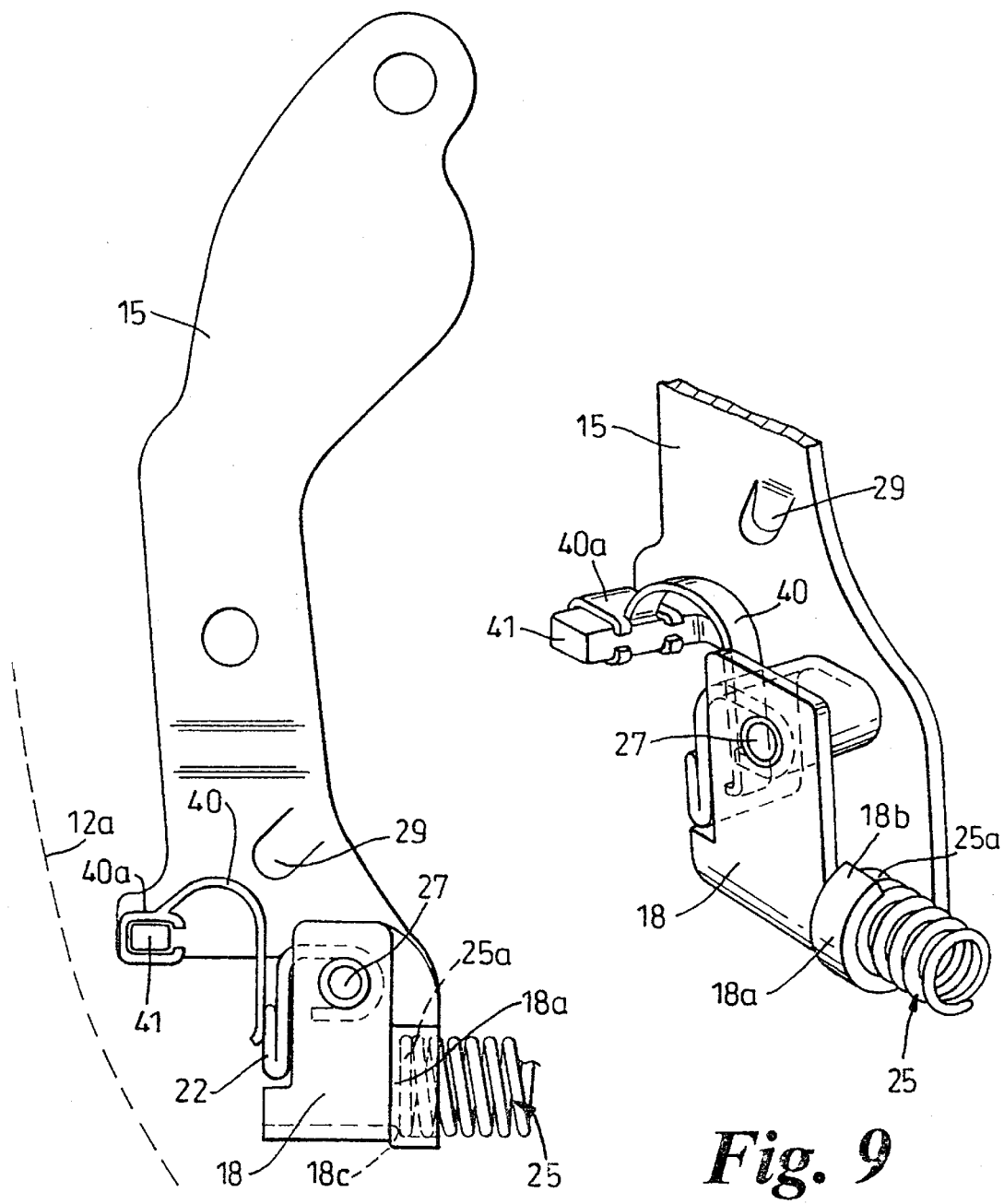
FIGS. 8 and 9 show side and perspective views respectively of a further form of latching flap in accordance with the inventions.

FIGS. 8 and 9, show part of an alternative form of parking lever 15 in which portion 18a of channel 18 is pressed to form a step 18c against which the end of 25a of spring 25 is held by bending over tab 18b after the insertion of spring 25. Flap 22 in FIGS. 8 and 9 is biased against the edge of channel 18 by a leaf spring 40 which is clipped at 40*a* onto a projection 41 which is bent out of lever 15. The projection 41 and leaf Spring 40 assist in deflecting the end 20 of cable 19 generally downwardly when it emerges from under flap 22 thus preventing the cable from entering between the lever 15 and the inside surface 12*a* (see FIG. 8) of shoe 12.

A will be appreciated the present invention provides a parking brake assembly which is of a relatively cheap construction and which provides a very positive locking of the end fitting of the handbrake cable to the lever 15 to prevent subsequent detachment of the cable.

What is claimed is:

1. A parking brake assembly which includes a lever for operation of a brake shoe to provide a parking function, the lever carrying an automatic latching device for automatically latching to the lever an end fitting on an operating cable, the assembly being characterised in that the automatic latching device comprises a flap mounted on the lever which is deflected aside by the end fitting as the cable is fed in a first direction towards the lever and which latches behind an abutment on the end fitting to latch the cable to the lever so that subsequent movement of the cable in a second direction opposite to the first direction moves the lever to operate the parking function.

2. An assembly according to claim 1 characterised in that the flap latches the cable against an edge of the lever.

3. An assembly according to claim 1 characterised in that the flap is spring biased towards the lever.

4. An assembly according to claim 3 characterised in that the spring is a coil spring surrounding a pin on which the flap pivots.

5. An assembly according to claim 3 characterised in that the spring is a leaf spring which bears against the flap.

6. An assembly according to claim 1 characterised in that the flap is gravity biased towards the lever.

7. An assembly according to claim 1 characterised in that an end of the lever is U-shaped in cross-section to form a channel and the flap is located adjacent one end of the channel with the cable having been fed along the channel and latched between the flap and an adjacent end edge of the channel.

8. An assembly according to claim 1 characterised in that the cable is fed towards the lever through an opening in a back plate of the assembly via a guide means.

9. An assembly according to claim 8 characterised in that the guide means comprises a compression spring through which the cable is fed, one end of the spring being attached to the back plate and the other end to the lever.

10. An assembly according to claim 8 characterised in that the guide means comprises a rigid tube.

11. An assembly according to claim 10 characterised in that a compression spring extends between an end of the guide tube adjacent the lever and the lever itself.

12. An assembly according to claim 10 characterised in that the guide tube is formed by a rolling process.

13. An assembly according to claim 1 characterised in that the lever carries an abutment which deflects the end of the cable after it has passed under the deflected flap to prevent the end of the cable passing between the lever and the inside of the adjacent brake shoe.

14. An assembly according to claim 1 characterised in that the lever carries a stop for contact with the adjacent brake shoe to limit the retraction of the lever when the parking brake is released.

15. A drum brake characterised by the inclusion of a parking brake assembly according to claim 1.

* * * * *